US012503939B1

(12) United States Patent
Yang et al.

(10) Patent No.: US 12,503,939 B1
(45) Date of Patent: Dec. 23, 2025

(54) SEALING PERFORMANCE SIMULATION METHOD FOR CEMENT SHEATH CONSIDERING WELLBORE FILTER CAKE AND FRACTURING WORKING CONDITIONS

(71) Applicant: SOUTHWEST PETROLEUM UNIVERSITY, Sichuan (CN)

(72) Inventors: Mou Yang, Sichuan (CN); Xinquan Zhu, Sichuan (CN); Jiyi Pu, Sichuan (CN); Zeping Song, Sichuan (CN); Shuangmiao Che, Sichuan (CN); Bin Tang, Sichuan (CN); Mulei Zhu, Sichuan (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 19/278,579

(22) Filed: Jul. 23, 2025

(30) Foreign Application Priority Data

Aug. 29, 2024 (CN) .......................... 202411196660.1

(51) Int. Cl.
*E21B 47/005* (2012.01)
(52) U.S. Cl.
CPC ........ *E21B 47/005* (2020.05); *E21B 2200/20* (2020.05)
(58) Field of Classification Search
CPC ........................... E21B 47/005; E21B 2200/20
See application file for complete search history.

(56) References Cited

U.S. PATENT DOCUMENTS

| 7,133,778 | B2* | 11/2006 | Ravi ....................... E21B 33/14 |
| | | | 702/6 |
| 12,306,169 | B2* | 5/2025 | Jandhyala ............ G01N 33/383 |
| 2017/0096874 | A1* | 4/2017 | Parsons ................... E21B 33/14 |

FOREIGN PATENT DOCUMENTS

| CN | 109657253 A | 4/2019 |
| CN | 113756744 A | 12/2021 |
| CN | 117332540 A | 1/2024 |

OTHER PUBLICATIONS

Notification to Grant Patent Right for Invention, Chinese Application No. 202411196660.1, mailed Mar. 14, 2025 (3 pages).

(Continued)

*Primary Examiner* — Elias Desta
(74) *Attorney, Agent, or Firm* — HOWARD M COHN and Associates, LLC

(57) ABSTRACT

A cement sheath sealing performance simulation method includes: establishing a three-dimensional deformable solid model of the borehole, dividing the model from inside to outside into a casing, cement sheath, a filter cake and a formation, performing mesh division, assigning material parameters to the casing, cement sheath and formation; establishing an element set for defining the filter cake material, assigning the element set to the meshes of the filter cake, obtaining material parameters of the filter cake based on Python code by considering the filter cake's heterogeneity, setting a boundary condition, simultaneously applying a load to the casing, inserting cohesive units for the interfaces between the casing and cement sheath, the cement sheath and the filter cake, and the filter cake and the formation respectively, performing linear damage evolution based on Maxs damage, and obtaining the equivalent plastic strain of the cement sheath and the micro-annulus size during the load application.

6 Claims, 7 Drawing Sheets

(56) References Cited

OTHER PUBLICATIONS

Yanbin Wang et al., "Chinese Journal of Applied Mechanics", Effect of temperature on shear stress characteristics of magnetorheological fluid, No. 04, vol. 37, Full text, issue date Aug. 15, 2020.

* cited by examiner

SEALING PERFORMANCE SIMULATION METHOD FOR CEMENT SHEATH CONSIDERING WELLBORE FILTER CAKE AND FRACTURING WORKING CONDITIONS

CROSS REFERENCE TO RELATED APPLICATIONS

The present disclosure claims the priority to the Chinese patent application with the filing No. 202411196660.1, entitled "SEALING PERFORMANCE SIMULATION METHOD FOR CEMENT SHEATH CONSIDERING WELLBORE FILTER CAKE AND FRACTURING WORKING CONDITIONS" and filed on Dec. 20, 2024 with the Chinese Patent Office, the contents of which are incorporated herein by reference in their entirety.

TECHNICAL FIELD

The present disclosure relates to the technical field of oil and gas field development, and particularly to a sealing performance simulation method for a cement sheath considering wellbore filter cake and fracturing working conditions.

BACKGROUND ART

In the field of oil and gas exploration and development, unconventional resources have great potentials. The use of large-scale fracturing technique is one of the key measures to increase the production capacity of unconventional oil and gas. However, during fracturing operations, the cement sheath is not only prone to fatigue damage under extreme environment conditions such as cyclic loads, high temperature and high pressure, but may also produce interface micro-annuli and even cracks, which seriously threaten the sealing integrity of the cement sheath. The cement sheath of the borehole has two interfaces: the first interface is between the casing and the cement sheath, and the second interface is between the cement sheath and the formation. During the drilling process, a large amount of filter cake may adhere to the wellbore. The filter cake is difficult to remove by circulating drilling fluid before cementing construction, which leads to the contact between cement slurry and filter cake during cement injection process to easily form a weak bonding surface due to the low strength of the filter cake. The weak bonding surface is prone to failure during fracturing, resulting in interface micro-annuli. Therefore, the in-depth research performed on the mechanical behavior and damage mechanism of the cement sheath during the fracturing process under the condition of considering the filter cake characteristics at the second interface has important academic value and practical significance.

In addition, with the increasing maturity of the application of numerical calculation methods in engineering problems and scientific research, most scholars use numerical simulation methods to study the sealing integrity of cement sheaths. However, in the research process, the ideal elastic-plastic model is often used to describe the stress-strain characteristics of cement sheaths, ignoring the changes of microcracks and micropores inside cement stone under fracturing alternating stress loads and the influence thereof on the overall performance of cement sheaths. In fact, these microcracks and micropores may change under the action of loads, and may form connections and cause damage to the cement stone, showing characteristics such as stiffness degradation. Therefore, the ideal model cannot accurately reflect the mechanical behavior of cement sheaths under actual working conditions. The simulation results calculated by the ideal model are quite different from the actual results and do not have a high reference value. In order to obtain a more realistic model, some scholars have proposed a strain softening model to describe the stress strain characteristics of cement sheaths to improve the accuracy of the model. At present, in theoretical research, some scholars have introduced damage mechanics theory to explore the mechanical properties of cement sheaths after plastic deformation under alternating loads. The research results show that the tensile and compressive elastic deformation properties of cement sheaths are crucial to the formation of micro-annuli and tensile failure of cement sheaths. These theoretical results provide new ideas for more accurate evaluation of the sealing performance of cement sheaths.

SUMMARY

In order to solve at least one of the above problems, the present disclosure proposes a sealing performance simulation method for a cement sheath considering wellbore filter cake and fracturing working conditions.

The technical solution of the present disclosure is: a sealing performance simulation method for a cement sheath considering wellbore filter cake and fracturing working conditions, including the following steps:

S1. establishing a three-dimensional deformable solid model of the borehole based on Abaqus software, and then dividing the model into casing, cement sheath, filter cake and formation from the inside to the outside in sequence and performing mesh division;

S2. assigning material parameters to the casing, cement sheath and formation based on measured values;

S3. establishing an element set used for defining the filter cake material, then assigning the element set to meshes of the filter cake, and obtaining the material parameters of the filter cake based on a Python code by considering the heterogeneity of the filter cake;

S4. inserting cohesive units into the interface between the casing and the cement sheath, the interface between the cement sheath and the filter cake, and the interface between the filter cake and the formation respectively, and performing linear damage evolution based on Maxs damage; and S5. setting a boundary condition for the model, and simultaneously applying a load to the casing based on actual working conditions; and then solving the model to obtain the interface separation situation and the equivalent plastic strain of the cement sheath during the load application process.

Beneficial effects: the present disclosure considers the actual situation of wellbore filter cake and non-negligible influence of the existing filter cake on the stress strain response of the cement sheath when applying an alternating load to the borehole, and can simulate the development of the interface micro-annuli at the second interface (between the cement sheath and the formation) during cementing, reveals the potential risk of sealing failure, and provides a reference for the study of cement sheath sealing property and related engineering evaluation.

DETAILED DESCRIPTION OF EMBODIMENTS

The specific embodiments of the present disclosure will be described clearly and completely below in conjunction with examples and drawings. Obviously, the described examples are only some embodiments of the present disclosure, rather than all embodiments.

A sealing performance simulation method for a cement sheath considering wellbore filter cake and fracturing working conditions includes the following steps:

S1, establishing a three-dimensional deformable solid model of the borehole based on Abaqus software, and then dividing the model into casing, cement sheath, filter cake and formation from the inside to the outside in sequence and performing mesh division.

Specifically, the embodiment is a redevelopment and application based on Abaqus software, which is a finite element simulation software. In this embodiment, a three-dimensional deformable solid model of the borehole is first established in the Part module of the Abaqus software. In actual operation, we usually need to set the size of the model to at least 10 times the actual size of the borehole, mainly to reduce the boundary effect of the model: when the model size is small, there is a problem that the conduction of stress and strain may not be fully developed, which in turn affects the accuracy of the simulation.

Figure 1:
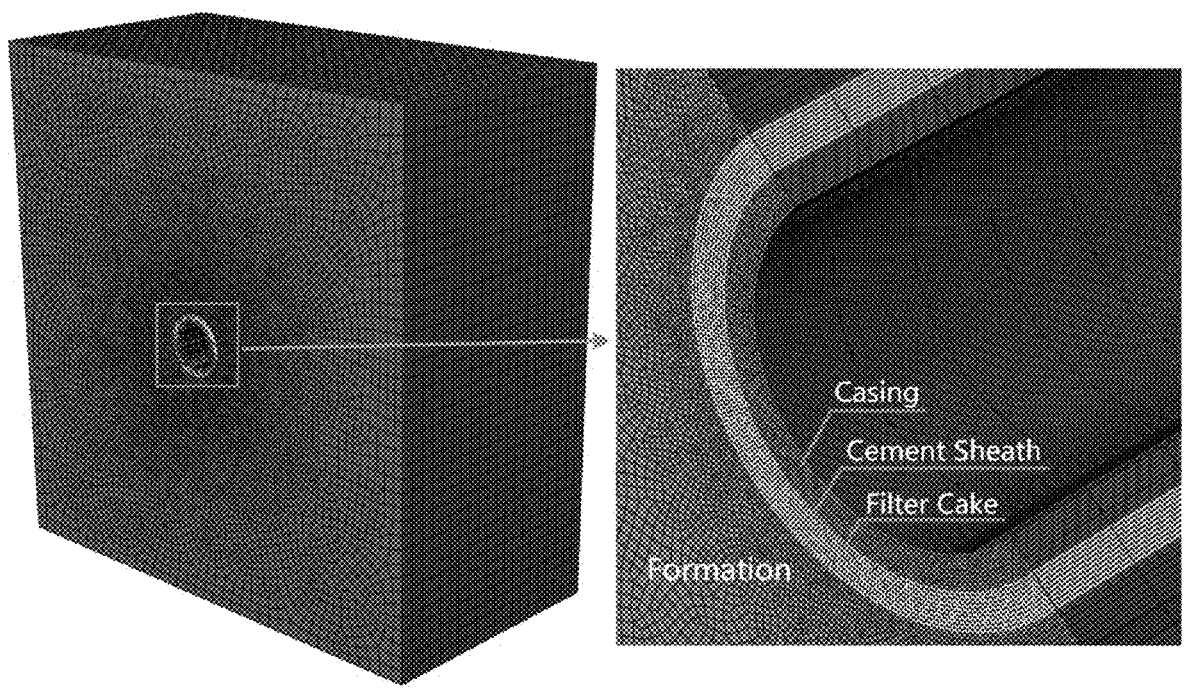
FIG. 1 is a diagram showing the model of embodiments of the present disclosure.

After modeling, the model needs to be divided from the inside to the outside in sequence into the casing, cement sheath, filter cake and formation according to the actual situation. The thickness ratio of the individual layers is set according to the actual situation. Meanwhile, for the overall size of the model, the inventors found that if the size of the model was small, in the subsequent simulation process, due to the influence of the boundary effect, the conduction of stress, strain, etc. of the cement sheath may not be developed, thereby affecting the accuracy of the model. To this end, after a large number of experiments, the inventors found that when the size of the model was set to at least 10 times the actual size of the borehole, the final model established can effectively overcome the influence of the boundary effect and has a higher accuracy. The final model is as shown in FIG. 1.

S2. assigning material parameters to the casing, cement sheath and formation based on measured values.

The measured values are parameters obtained from indoor tests or logging data according to actual conditions, and these parameters includes elastic modulus, yield strength and Poisson's ratio. This step is performed in the Property module in actual operation, to assign material parameters to the casing, cement sheath and formation respectively.

Meanwhile, in the present disclosure, in addition to the above-mentioned material parameters, considering the characteristics that the cement sheath is easy to undergo plastic deformation and plastic damage under external load conditions, and considering that the formation and casing change little and are not the research focuses of the embodiments of the present disclosure, in this embodiment, it is further necessary to set the cement sheath as a plastic damage material, and set the casing and formation as elastic materials, in order to facilitate subsequent model calculations.

The plastic damage model of the cement sheath is as follows:

$$\sigma_{ij} = (1 - d_s) D_{ij}^{el} (\varepsilon_{ij} - \varepsilon_{ij}^{pl})$$

in the formula, $\sigma_{ij}$ indicates the Cauchy stress; $\varepsilon_{ij}$ and $$\varepsilon_{ij}^{pl}$$

indicate the total strain and plastic strain respectively;

$$D_{ij}^{el}$$

indicates the elastic stiffness, MPa; and $d_s$ indicates the damage variable;

the damage variable $d_s$ is obtained by the following formulas:

$$d_s = \frac{W_0 - W_\varepsilon}{W_0}, \quad W_0 = \frac{E_0 \varepsilon^2}{2}; \quad W_\varepsilon = \int \sigma d\varepsilon = \int f(\varepsilon) d\varepsilon,$$

in the formulas, $W_0$ indicates the strain energy density in damage-free state; $E_0$ indicates the initial elastic modulus; $\varepsilon$ indicates the compressive strain; $\sigma$ indicates the stress tensor; $W_\varepsilon$ indicates the strain energy density in damaged state.

In this embodiment, material parameters are as shown in Table 1.

TABLE 1

Material parameter data table of casing/cement sheath/filter cake/formation

| Material | Inner diameter (mm) | Outer diameter (mm) | Elastic modulus (GPa) | Poisson's ratio | Yield strength (MPa) |
| --- | --- | --- | --- | --- | --- |
| Casing | 163.19 | 196.85 | 210 | 0.3 | — |
| Cement sheath | 196.85 | 237.3 | 6 | 0.2 | 20 |

TABLE 1-continued

Material parameter data table of casing/cement sheath/filter cake/formation

| Material | Inner diameter (mm) | Outer diameter (mm) | Elastic modulus (GPa) | Poisson's ratio | Yield strength (MPa) |
|---|---|---|---|---|---|
| Filter cake | 237.3 | 241.3 | 1.8-2.2 | 0.18-0.2 | 2-4 |
| Formation | 241.3 | — | 25 | 0.2 | — |

Meanwhile, it can be seen from Table 1 that in this embodiment, the material parameters of the casing, cement sheath and formation are relatively uniform, so they can be assigned values uniformly. However, for the filter cake, its parameter ranges span widely, making it difficult to assign values uniformly.

S3, establishing an element set used for defining the filter cake material, then assigning the element set to the meshes of the filter cake, and obtaining the material parameters of the filter cake based on Python code by considering the heterogeneity of the filter cake.

S31, using Tool to create the element set: first, using the Tool to create the element set and naming it as all; importing the sys module from the Python library provided by Abaqus to operate the Python runtime environment; importing the os module for environment variable access, path operations, etc.; and importing the random module and using the randint function in the module to achieve random distribution in subsequent steps.

S32, creating a function of material parameters and filter cake elastic properties, dividing the element set into a plurality of element subsets, and randomly assigning to each subset a cross section containing filter cake material parameters;

defining the function Cre_mat_pro, which is used to create section properties, including four parameters: material name, elastic modulus, yield strength, and Poisson's ratio; creating in Model-1 a material having elastic properties and plastic properties; and creating a homogeneous solid section in Model-1, where the section is associated with the material just created, and there is no need to specify the thickness;

defining the function Crea_elem_sets, which contains parameters n and matifo, and is used to divide all elements of component Part-1 in the model Model-1 into several element sets and randomly assign a section to each set; introducing the variable p to obtain the reference of component Part-1 in the model Model-1; introducing the variable elsts to obtain all elements in the element set named as all; calling the function len to calculate the number of elements in the all set (i.e. the set named as all) and defining as elenum; and calling the function len to calculate the length of the matifo list, that is, the number of available section names, and defining as matnum; and S33, creating a variable p to obtain a model reference, storing in the variable p, and then accessing and operating the component through the p; creating a variable p to obtain a model reference, storing in the variable p, and then accessing and operating the component through the p; and obtaining a list of all elements from the Element Set created by the component, calling the len function to calculate the number of elements in the set as elenum and the number of available section names as matnum.

S34, using a for loop to traverse the element set to obtain the number of required sets, and simultaneously using the total number of elements in the element set/n+1 as the upper limit of the loop, where n represents the number of elements expected in each element subset in S32;

using a for loop to create an element set, setting the number of iterations to i, where the total number of elements is elenum; if elenum is not an integer multiple of n, the last set is skipped, so elenum/n+1 is used as the upper limit of the loop; inside the loop, firstly whether it is the last set is determined; if (i!=elenum/n), it is not the last set, then a new set set2 is created according to a block size of n elements, otherwise, a new set set2 including all the remaining elements is created;

calling the randint function to randomly select an index of one section name from 0 to matnum-1 in the matifo list, assigning the section name to the newly created set set2, and defining the region variable as region; calling the SectionAssignment function to specify the section parameters of the region, the section parameters including sectionName (the section name to be assigned, a section name randomly selected from the matifo list), offset (the offset of the section relative to a surface in the element set, set to 0.0), offsetType (offset type, set to MIDDLE_SURFACE), and thicknessAssignment (thickness assignment method, set to FROM_SECTION);

S35, based on the measured values of the material parameters and heterogeneity of the filter cake, assigning values to the function and element subsets in S32, and then solving by using Python to obtain the material parameters of the filter cake in the model;

defining the function main_function, which is used to input the actual parameters of the filter cake and call the function defined in S32 to assign the material properties of the filter cake part, where when inputting the actual parameters, the actual parameters are randomly selected within the ranges of the measured values of the filter cake, and these input parameters need to cover the upper and lower limits of the measured values, so that the final parameters obtained are more in line with the actual situation.

In this embodiment, the material property matifo list is set to ('mat1', 1800, 2, 0.2), ('mat2', 2000, 3, 0.18), ('mat3', 2200, 4, 0.18), and the four parameters in the elements are material name, elastic modulus, yield strength, and Poisson's ratio. The three elements in the matifo list are assigned temporarily to the variable ma by using a for loop, and the ma is introduced into the function Cre_mat_pro to create a section and assign properties; then the Crea_elem_sets function is called, the number of elements n in the set is set to 50, and a section related to the material defined in the matifo list is randomly assigned to each set. Although three groups of parameters are selected within the filter cake parameter range for assignment in this embodiment, it is clear to those skilled in the art that different numbers of parameters may be selected for assignment according to actual conditions.

The function main_function is run to assign material properties to the entire filter cake part of the model.

Through the steps of the embodiment of the present disclosure, values may be well assigned to the filter cake, so that the filter cake parameters are closer to those of the existing filter cake and the final result is more accurate.

S4, inserting cohesive units into the interface between casing and cement sheath, the interface between cement sheath and filter cake, and the interface between filter cake and formation respectively, and performing linear damage evolution based on Maxs damage.

In this step, the following sub-steps are included: inserting cohesive units into the meshes of the interface between casing and cement sheath, the interface between cement sheath and filter cake, and the interface between filter cake and formation, and setting properties, and then performing damage evolution based on the Maxs damage mechanism, where the damage evolution type is the Energy type.

In the above, when inserting the cohesive units, it specifically includes: creating a material for the Cohesive unit in the Property module, where for the material, the elastic property is set to surface force, and the elastic modulus is set to 10 GPa.

Meanwhile, the damage evolution includes the following sub-steps.

a) Cohesive unit is particularly suitable for simulating interface bonding behavior, can accurately capture the normal and tangential stress-strain relationships at the interface, thereby providing the high-precision simulation result, can fully simulate the interface separation behavior of a composite material, and is fully suitable for the calculation of the development of interface micro-annuli in the present disclosure.

b) Cohesive unit is based on the damage mechanics theory and follows the "Traction-Separation" law, and the Cohesive unit is inserted into the contact surfaces to simulate the cohesive performance between the two parts. During the numerical simulation, when the displacements of the contact surfaces increase to the displacement when the Cohesive unit is completely destroyed, the contact surfaces may separate and produce an interface micro-annulus.

c) The process of interface separation mainly includes three stages: stress calculation in the elastic stage: at the beginning of loading, the Cohesive unit behaves as linear elasticity, meaning that stress is proportional to strain. At this time, the stress on the interface does not reach the damage threshold and the interface remains intact. Assuming that the interface is in an elastic state, the stress is calculated based on the current strain, the stress vector σ and the strain vector ε may be multidimensional, including the normal component and two tangential components. The stress-strain relationship in the elastic stage may be expressed as:

$$\sigma = K\varepsilon.$$

In the formula, K indicates the 3×3 stiffness matrix of the Cohesive unit, including the normal and tangential stiffness coefficients; σ indicates the stress vector, MPa; and ε indicates the strain vector, %.

d) Damage criterion assessment: whether the current stress state meets the damage criterion is assessed. For the Energy-based damage criterion, it is necessary to calculate the current energy release rate G and compare it with the damage threshold $G_c$. The energy release rate G may be calculated by the following formula.

The current energy release rate is obtained by the following formula:

$$G = \frac{1}{2}(\sigma_n \Delta\varepsilon_n + \sigma_s \Delta\varepsilon_s + \sigma_t \Delta\varepsilon_t),$$

In the formula, $\sigma_n$, $\sigma_s$, and $\sigma_t$ indicate the stresses in the normal direction and the two tangential directions respectively; and $\Delta\varepsilon_n$, $\Delta\varepsilon_s$, and $\Delta\varepsilon_t$ indicate the strain increments corresponding to the normal direction and the two tangential directions respectively.

e) If the current energy release rate G reaches the damage threshold $G_c$, the interface begins to be damaged. The damage variable D is subjected to iterative calculation according to the damage evolution law. When the damage variable D reaches 1, it is considered that the interface has been completely destroyed and separation occurs. For the linear damage evolution model, the damage variable may be expressed as:

$$D = \frac{G}{G_c}.$$

In the above, G indicates the energy release rate, MN/m; and $G_c$ indicates the damage threshold, MN/m.

S5, setting a boundary condition for the model and simultaneously applying a load to the casing based on actual working conditions; and then solving the model to obtain the interface separation situation and the equivalent plastic strain of the cement sheath during the load application process.

In this embodiment, the following sub-steps are specifically included: creating an analysis step, where the analysis step is of a type of a static analysis step, and setting the step length of the analysis step; creating a load, where the load is an alternating load, and applying the load to the inner wall of the casing; and creating the boundary condition, and defining, in the analysis step, three degrees of freedom in three directions of the model.

In the above, the analysis step is set to step1, the type is static, the time length is 1, the maximum number of incremental steps is 1000, the incremental step is 0.01 minimally, and 0.05 maximally.

The boundary condition is set as follows: defining three degrees of freedom U1, U2, and U3 on the left, bottom, and front of the model, which represent displacement in the x-axis direction, displacement in the y-axis direction, and displacement in the z-axis direction respectively, and simultaneously setting a displacement/rotation constraint in each direction; and setting, when applying a load to the casing, the load in the Load module, creating a pressure load in Step 1 to act on the inner wall of the casing, where the amplitude change of the load is established using a table type, the load is of a type of an alternating load, and each load cycle is completed within 1 analysis step.

In this embodiment, the load is set to 75 MPa maximally and 40 MPa minimally, to simulate the alternating load change process during the fracturing process.

Figure 2:
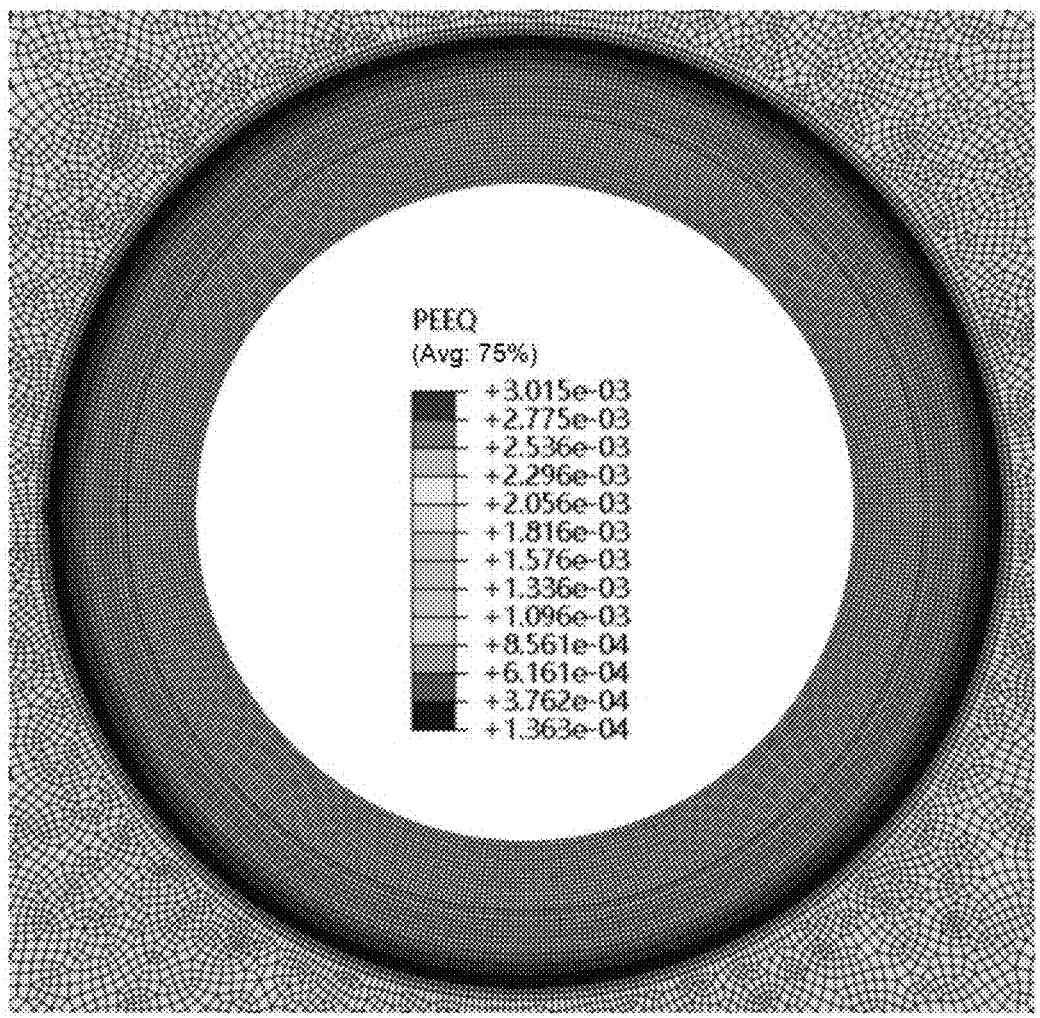
FIG. 2 is an equivalent plastic strain nephogram of embodiments of the present disclosure.
Figure 3:
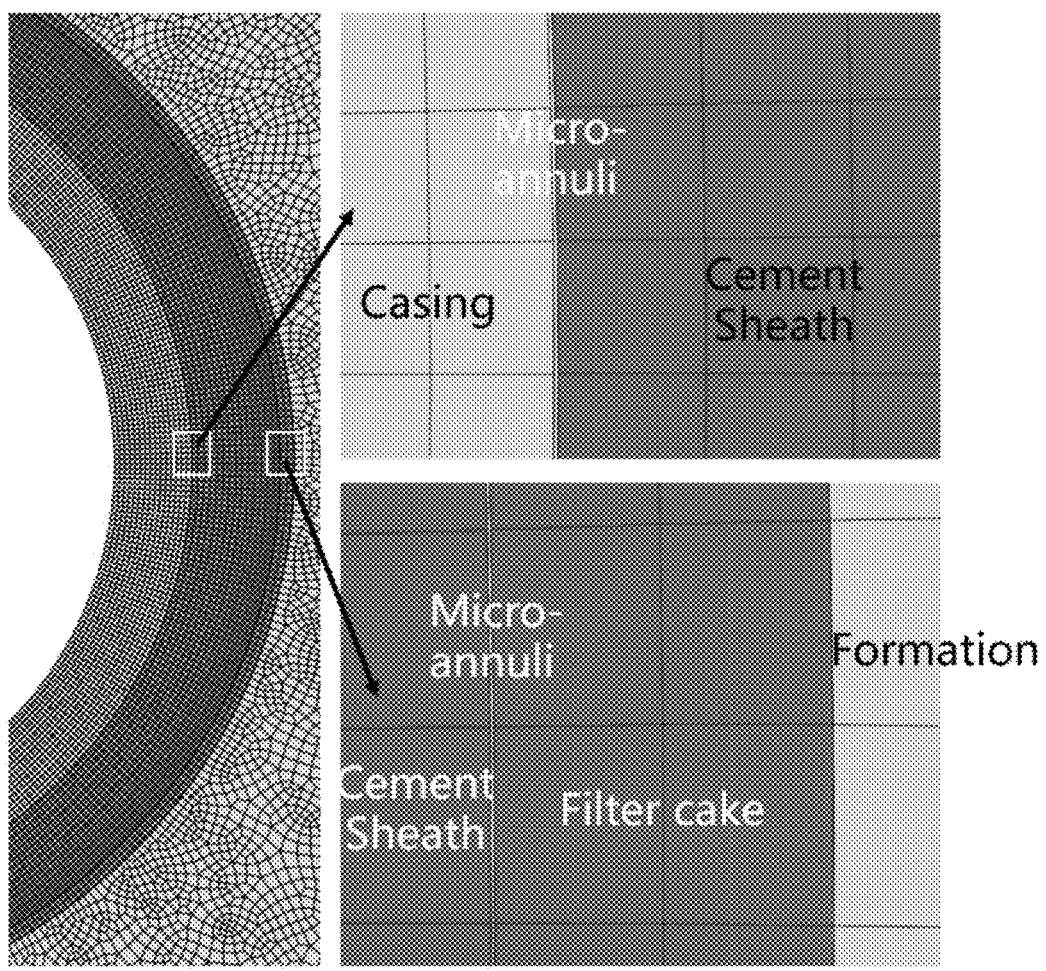
FIG. 3 is a diagram showing interface micro-annuli after a load is applied of embodiments of the present disclosure.
Figure 4:
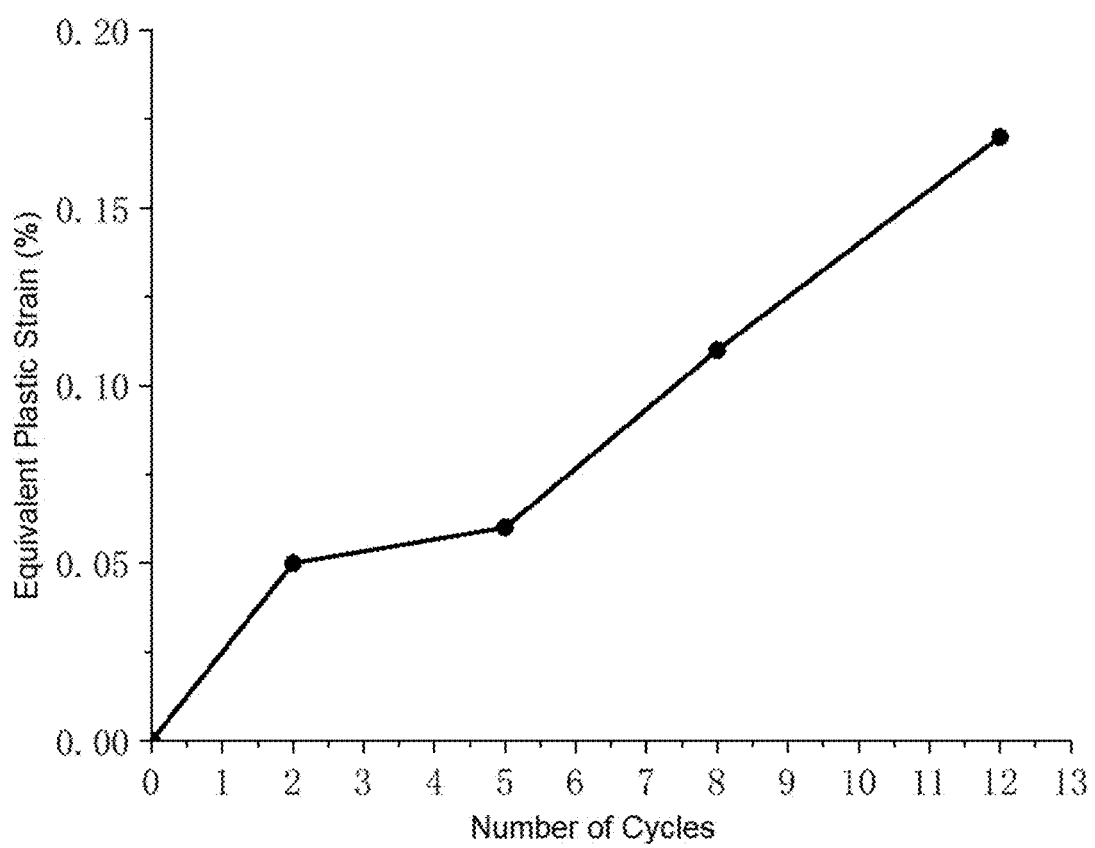
FIG. 4 is a diagram showing the change of equivalent plastic strain of the inner wall of the cement sheath with the number of cycles of embodiments of the present disclosure.
Figure 5:
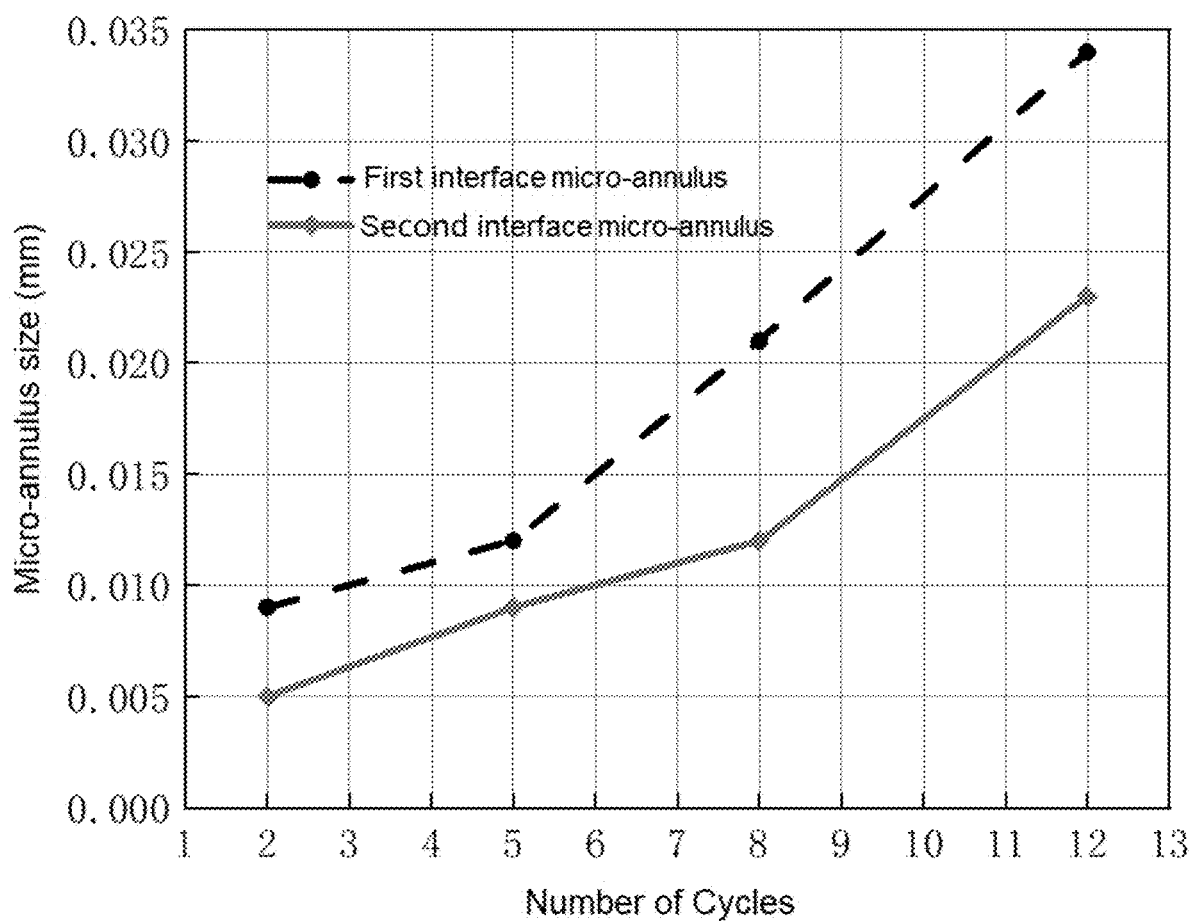
FIG. 5 is a diagram showing the development of interface micro-annuli of cement sheath under different numbers of cycles of embodiments of the present disclosure.

Subsequently, Job1 is created to solve the combination model and view the calculation result after the solving, and the required unit data in the Visualization module is taken out for analysis. The final results are as shown in FIG. 2 to FIG. 5, where FIG. 2 is an equivalent plastic strain nephogram (PEEQ) of the model, FIG. 3 is an interface separation situation diagram, FIG. 4 is a diagram showing the change of the equivalent plastic strain of the inner wall of the cement sheath with the number of cycles, and FIG. 5 is a diagram showing the development of interface micro-annuli of the cement sheath under different numbers of cycles. In the above, the interface between the casing and the cement sheath is the first interface, and the interface between the cement sheath and the formation is the second interface. According to the existing logging data, both the first interface and the second interface have micro-annuli and interface separation under external load conditions, and the results of the embodiments of the present disclosure well confirm this point.

Figure 6:
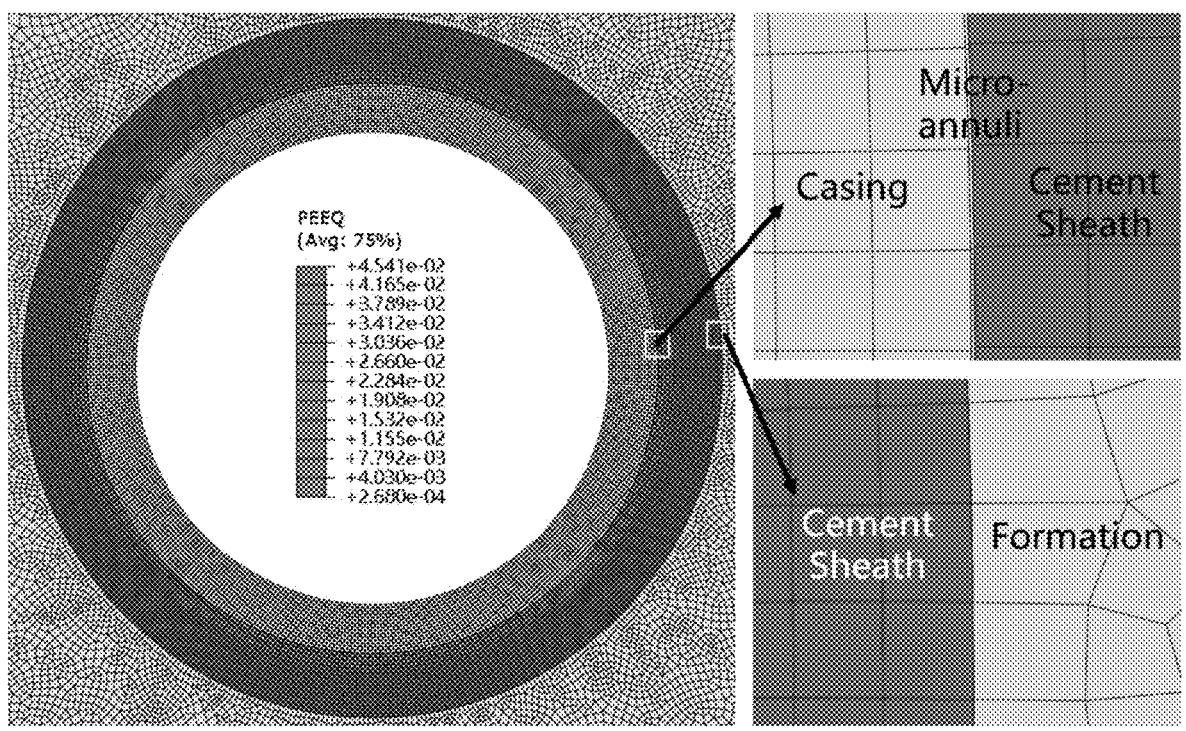
FIG. 6 is a diagram showing the interface micro-annuli after a load is applied of Comparative Example.
Figure 7:
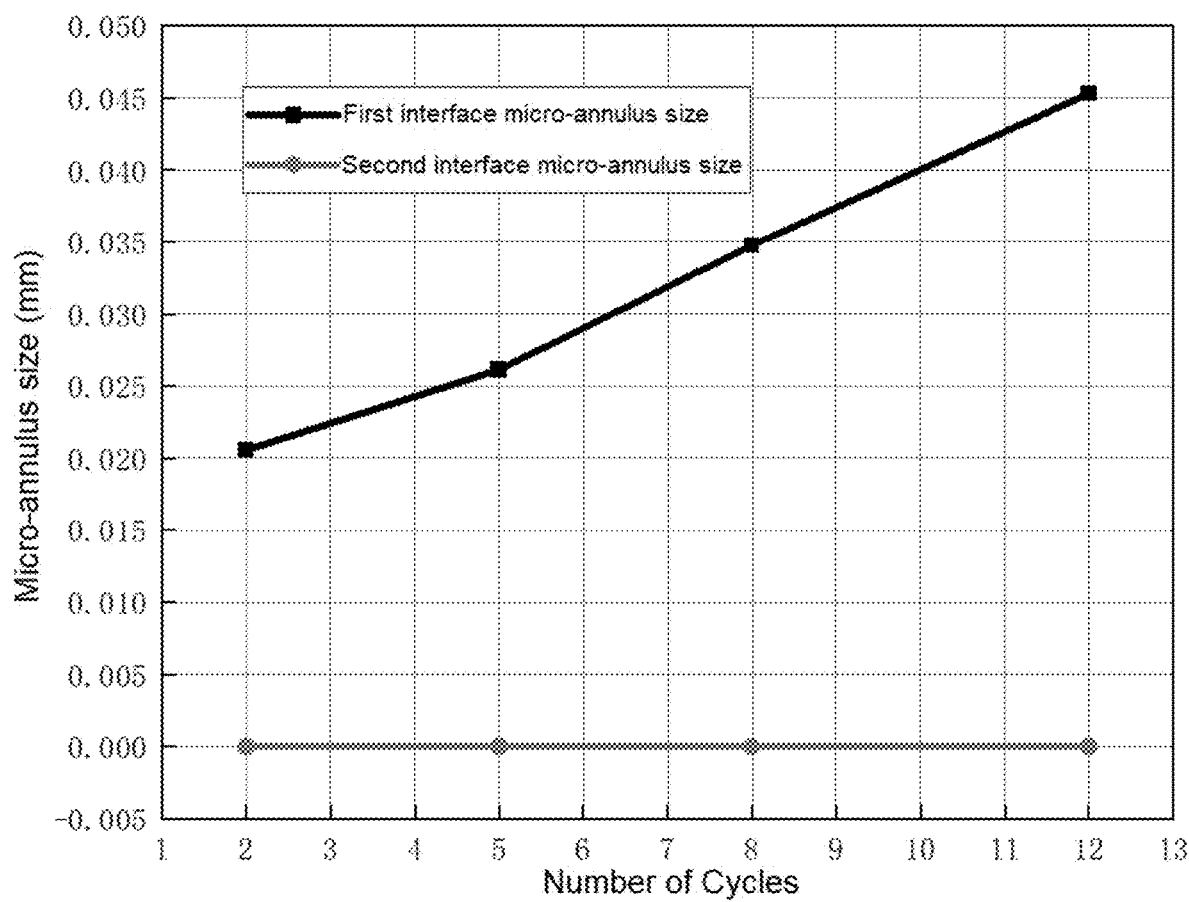
FIG. 7 is a diagram showing the development of interface micro-annuli of the cement sheath under different numbers of cycles of Comparative Example.

In order to illustrate the advantages of the method of the embodiment of the present disclosure, a comparative example is provided. In this comparative example, the model is not provided with a filter cake, and is analyzed by using the analysis method of this embodiment. The final results are as shown in FIG. 6 and FIG. 7. In the above, FIG. 6 is a diagram showing an interface micro-annuli after the load is applied, and FIG. 7 is a diagram showing development of the interface micro-annuli of the cement sheath under different numbers of cycles. From the figures, it can be seen that without considering the filter cake, only the first interface has a certain micro-annulus and interface separation situation, which is obviously inconsistent with the actual situation.

From the comparison of the figures, it can be seen that the results of the method in the embodiment of the present disclosure are more consistent with the actual situation.

The above are only preferred embodiments of the present disclosure, and do not limit the present disclosure in any form. Although the present disclosure has been disclosed using the preferred embodiments above, they are not used to limit the present disclosure. Any person skilled in the art may make, without departing from the scope of the technical solution of the present disclosure, some changes or modifications to form equivalent embodiments using the technical contents disclosed above. Any content not departing from the technical solution of the present disclosure, including any simple alterations, equivalent changes and modifications made to the above embodiments in accordance with the technical essence of the present disclosure, shall still fall within the scope of the technical solution of the present disclosure.

The invention claimed is:

1. A sealing performance simulation method for a cement sheath considering wellbore filter cake and fracturing working conditions, comprising:
   S1, establishing a three-dimensional deformable solid model of a borehole based on finite element simulation software, then dividing the model into a casing, the cement sheath, a filter cake and a formation from inside to outside in sequence, and performing mesh division;
   S2, assigning material parameters to the casing, the cement sheath and the formation based on measured values, wherein the material parameters comprise plasticity or elasticity, the formation and the casing are of elastic materials, the cement sheath is of a plastic material, and a plastic damage model of the cement sheath is as follows:

$$\sigma_{ij} = (1-d_s)D_{ij}^{el}(\varepsilon_{ij} - \varepsilon_{ij}^{pl})$$

wherein, $\sigma_{ij}$ indicates a Cauchy stress; $\varepsilon_{ij}$ and $$\varepsilon_{ij}^{pl}$$

indicate a total strain and a plastic strain respectively;

$$D_{ij}^{el}$$

indicates elastic stiffness, MPa; and $d_s$ indicates a damage variable;
   wherein the damage variable $d_s$ is obtained by following formulas:

$$d_s = \frac{W_0 - W_\varepsilon}{W_0}, W_0 = \frac{E_0 \varepsilon^2}{2}; W_\varepsilon = \int \sigma d\varepsilon = \int f(\varepsilon)d\varepsilon,$$

in the formulas, $W_0$ indicates a strain energy density in a damage-free state; $E_0$ indicates an initial elastic modulus; $\varepsilon$ indicates a compressive strain; $\sigma$ indicates a stress tensor; and $W_\varepsilon$ indicates a strain energy density in a damaged state;
   S3, establishing an element set used for defining a filter cake material, then assigning the element set to meshes of the filter cake, and obtaining the material parameters of the filter cake based on a Python code by considering heterogeneity of the filter cake, wherein the step comprises following sub-steps:
   S31, using Tool to create the element set;
   S32, creating a function of the material parameters and elastic properties of the filter cake, dividing the element set into a plurality of element subsets, and randomly assigning, to each of the subset, a cross section containing the material parameters of the filter cake;
   S33, creating a variable p to obtain a model reference, storing in the variable p, and then accessing and operating a component through the p;
   S34, using a for loop to traverse to obtain number of required sets, and simultaneously using a total number of elements in the element set/n+1 as an upper limit of the loop, wherein n represents number of desired elements in each element subset in S32; and
   S35, assigning values to the function and the element subsets in S32 based on the measured values of the material parameters and heterogeneity of the filter cake, and then solving by using Python to obtain the material parameters of the filter cake in the model;
   S4, inserting cohesive units into an interface between the casing and the cement sheath, an interface between the cement sheath and the filter cake, and an interface between the filter cake and the formation, and performing linear damage evolution based on a Maxs damage; and
   S5. setting a boundary condition for the model and simultaneously applying a load to the casing based on actual working conditions, and then solving the model to obtain an interface separation situation and an equivalent plastic strain of the cement sheath during a load application process.

2. The method according to claim 1, wherein a size of the model is at least 10 times an actual size of the borehole.

3. The method according to claim 1, wherein the material parameters further comprise elastic modulus, yield strength and Poisson's ratio.

4. The method according to claim 1, wherein S4 comprises following sub-steps: inserting cohesive units into meshes of the interface between the casing and the cement sheath, the interface between the cement sheath and the filter cake, and the interface between the filter cake and the formation and setting properties, then performing damage evolution based on a Maxs damage mechanism, wherein a type of the damage evolution is an Energy type, and performing solving and analyzing based on a Jobs module according to a result of the damage evolution, to obtain an equivalent plastic deformation nephogram and an interface separation situation diagram, thereby obtaining a sealing performance of the cement sheath under an external load condition.

5. The method according to claim 4, wherein during the damage evolution, a damage result is obtained based on a current energy release rate and a damage threshold of the interface; and the current energy release rate is obtained by a following formula:

$$G = \frac{1}{2}(\sigma_n \Delta \varepsilon_n + \sigma_S \Delta \varepsilon_S + \sigma_t \Delta \varepsilon_t),$$

wherein $\sigma_n$, $\sigma_s$, and $\sigma_t$ indicate stresses in a normal direction and two tangential directions respectively; and $\Delta \varepsilon_n$, $\Delta \varepsilon_s$, and $\Delta \varepsilon_t$ indicate strain increments corresponding to the normal direction and the two tangential directions respectively.

6. The method according to claim 1, wherein in S5, the setting the boundary condition and applying the load comprises following sub-steps: creating an analysis step, wherein the analysis step is of a type of a static analysis step, and setting a step length of the analysis step; creating a load, wherein the load is an alternating load, and applying to an inner wall of the casing; and creating the boundary condition, and defining, in the analysis step, three degrees of freedom in three directions of the model.

* * * * *